United States Patent [19]
Larsen et al.

[11] Patent Number: 6,105,822
[45] Date of Patent: Aug. 22, 2000

[54] DEVICE AND METHOD FOR MIXING AND DISPENSING TWO FLOWABLE MATERIALS

[75] Inventors: Malcolm C. Larsen, Port St. Lucie; Craig W. Decker, Stuart, both of Fla.

[73] Assignee: Liquid Control Corporation, North Canton, Ohio

[21] Appl. No.: 09/392,057

[22] Filed: Sep. 8, 1999

[51] Int. Cl.[7] .................................................. B67D 5/60
[52] U.S. Cl. ...................... 222/134; 222/145.6; 222/504
[58] Field of Search ................................ 222/134, 145.6, 222/108, 424, 235, 318

[56] References Cited

U.S. PATENT DOCUMENTS

| | | | |
|---|---|---|---|
| 3,806,084 | 4/1974 | Seese | 251/63 |
| 4,095,722 | 6/1978 | Miller | 222/1 |
| 4,942,984 | 7/1990 | Miller | 222/309 |
| 5,092,492 | 3/1992 | Centea | 222/145.6 |
| 5,350,084 | 9/1994 | Miller et al. | 222/137 |
| 5,397,180 | 3/1995 | Miller | 366/338 |
| 5,609,271 | 3/1997 | Keller et al. | 222/145.6 |
| 5,765,729 | 6/1998 | Miller et al. | 222/380 |

*Primary Examiner*—Philippe Derakshani
*Attorney, Agent, or Firm*—Sand & Sebolt

[57] ABSTRACT

A device for mixing and dispensing a pair of flowable materials includes a housing containing a pair of control valves for controlling the flow of the two materials into a mixer tube mounted on an outlet end of the housing. The mixer tube contains a mixing element within the bore of the tube. A control device such as a pneumatic piston, moves a shaft which is connected to the mixing element, to move the mixing element linearly axially within the tube to prevent the leakage of materials from within the tube after the control valves on the housing are moved to a closed position. An air motor may be connected to the shaft for rotating the mixing element within the tube to enhance the mixing of the materials moving therethrough.

27 Claims, 11 Drawing Sheets

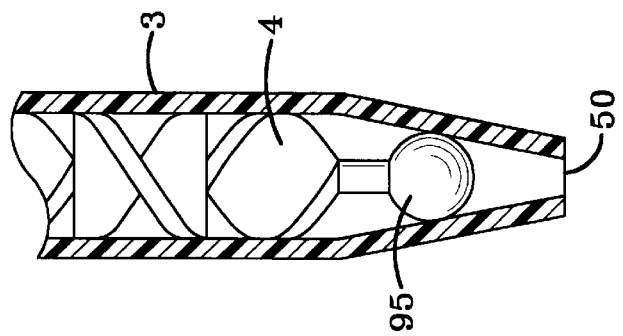
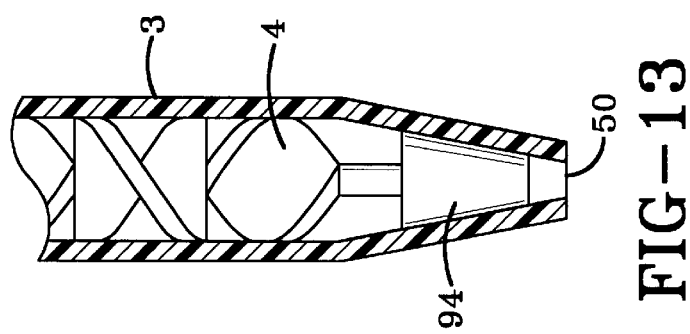
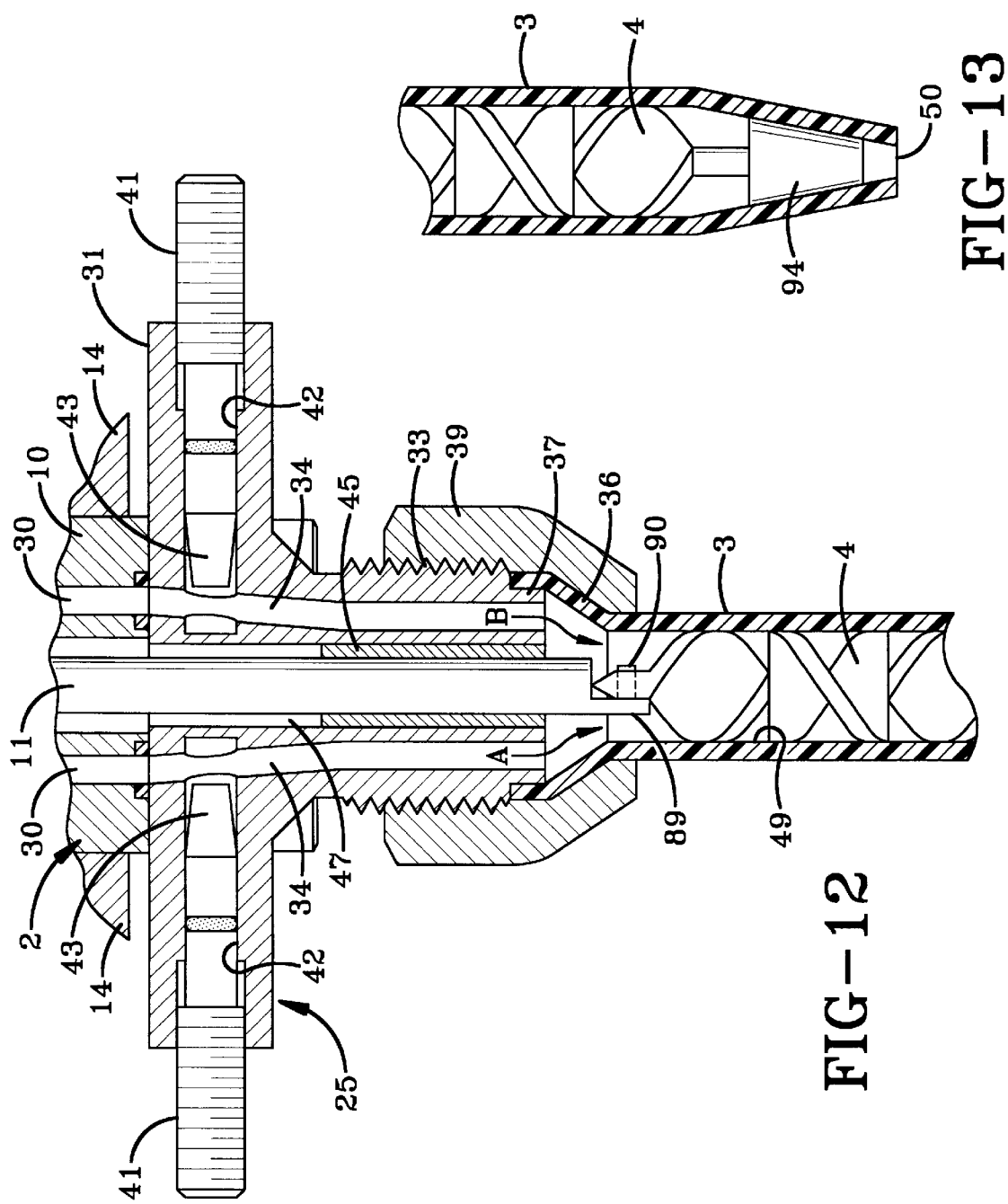

DEVICE AND METHOD FOR MIXING AND DISPENSING TWO FLOWABLE MATERIALS

BACKGROUND OF THE INVENTION

1. Technical Field

The invention relates to dispensing devices for dispensing and mixing plural component flowable materials. More particularly, the invention relates to a dispensing device and method which provides a positive shut-off or snuff back of the flowable material to prevent drippage of the material from the device when the device is in the off position and to a device and method which provides for the dynamic mixing of the two materials as they move through a mixing tube.

2. Background Information

An ever increasing number of products used in everyday life require the dispensing of liquid or semi-liquid flowable materials in one form or another for their manufacture. These flowable materials typically comprise two component reactive resins. The types of materials dispensed include virtually any flowable liquid, semi-liquid, or paste such as epoxies, polyurethanes, silicones, polyester, acrylics, polysulfides and phenolic, for example. Common commercial manufacturing processes in which such materials are used include injecting precise amounts of mixed resins into molds, open pouring of mixed foam, encapsulating electric components with insulating resins, applying continuous beads of structural adhesives, injecting polyester into closed molds, sealing joints with two part polysulfides, and numerous other functions requiring the accurate control, delivery and mixing of two reactive component materials. Examples of product application include air filters, under the hood electronic assemblies and safety devices for the automotive and trucking industry, air foils, encapsulation of magnetic and other advanced electrical devices for the air and space industry, component mounting, and components for apparatus such as switches, power supplies, heating assemblies, and other electronic components for the appliance industry.

Thus, as the aforesaid flowable mixed materials continue to be consumed in increasing quantities, the demand for precise liquid and semi-liquid, mixing and dispensing devices is also growing at an accelerated rate. The industry is continuously searching for more reliable, efficient and accurate, mixing and dispensing devices for plural component flowable materials for a variety of purposes. For example, a particular application may require that a device efficiently and accurately dispenses such plural materials ranging in amounts from less than 1 cubic centimeter to many gallons. However, although the industry is calling for more exact device, it is also requiring that the device design be simple and minimize waste, and capable of being operated by production personnel or conveniently integrated with automation devices such as robots and conveyor systems.

Problems currently exist because many prior art plural component mixing and dispensing devices permit small amounts of the mixed material to leak or drip from the outlet end of a mixer tube after the control valves within the device have been moved to an off position. This is unacceptable in many production applications. Another problem with prior art mixing and dispensing devices, especially those using a motionless mixer mounted within a mixer tube, such as shown in U.S. Pat. No. 5,092,492, is that the two materials are not mixed sufficiently as they move through the mixing elements. Furthermore, the rate of mixing and dispensing can be adversely effected by the back pressure created within such a motionless mixing element.

Some examples of mixing and dispensing devices for two component liquid materials are shown in U.S. Pat. Nos. 5,092,492 and 5,350,084. Other types of dispensing and metering devices only dispense a single material such as shown in U.S. Pat. Nos. 3,806,084; 4,095,722; and 4,942,984. However, these devices will not use a motionless type of mixer at the outlet end of the device and thus do not encounter the same problems as those devices which meter and dispense two component materials.

Therefore, the need exists for an improved liquid mixing and dispensing device in which plural component materials are mixed adjacent to the point of dispensing, in a helical type mixing element, which device provides for the positive stopping of the mixed materials to prevent dripping when the feed control valves are shut off, and to a device which can rotate the heretofore motionless mixing element to enhance the mixing of the plural components.

SUMMARY OF THE INVENTION

Objectives of the invention include providing an inline mixing and dispensing device in which plural component liquids are positively mixed adjacent to the dispensing location.

Another objective of the invention is to provide a mixing and dispensing device which can be portable and easily handled by a human operator, or can be conveniently integrated into automation systems.

A still further objective of the invention is to provide a mixing and dispensing device which allows for accurate volume and rate control, and which can accurately dispense materials comprised of fluid flowable components having widely varying ratios.

Still another objective of the invention is to provide a mixing and dispensing device which can dispense liquids having a wide range of viscosities and cure times through a disposable mixer element so as to eliminate the need for solvent cleaning.

A further objective of the invention is to provide a dispensing device which can provide a dynamic mixing action to a heretofore motionless helical mixer to enhance the mixing effect of the mixer while increasing the flow through capability thereof in combination with a non-drip shut-off feature thereof.

Another objective is to provide a mixing and dispensing device which is of simple construction, which achieves the states objectives in a simple, effective and inexpensive manner, which solves problems and satisfies needs existing in the art.

A further objective of the invention to provide an improved method of dispensing a pair of flowable materials which controls overrun discharge, which removes pressure from the discharge port immediately after a shot has been discharged, and which can provide a "snuff back" effect to prevent dripping.

These and other advantages and objectives are obtained by the device of the present invention for mixing and discharging two flowable materials, the general nature of which may be stated as including a housing having a pair of chambers, each having an inlet and an outlet for admitting and discharging a respective one of the flowable materials into and out of a respective one of the chambers; a mixer tube formed with a hollow internal bore extending therethrough having inlet and outlet ends, said inlet end communicating with the outlets of the housing chambers for admitting the flowable materials into the tube; a mixing element mounted within the bore of the mixer tube to mix the flowable materials as they move through the bore; and control means connected to the mixing element for moving the mixing element and mixer tube axially with respect to each other to stop the flow of materials from the outlet end of the tube.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended Claims.

FIG. 7 is a fragmentary view with portions broken away in section of the piston control portion of the dispensing equipment of FIG. 1;

FIG. 8 is a fragmentary sectional view similar to FIG. 7 showing the movement of the air motor and control shaft upon actuation of the pneumatic pistons;

FIG. 12 is an enlarged fragmentary sectional view of the discharge end of the dispensing equipment and the static mixer connection thereto;

FIG. 13 is an enlarged fragmentary sectional view of one embodiment of the outlet end of the static mixer tube;

FIG. 14 is a view similar to FIG. 13 showing a different embodiment for providing a positive blockage at the outlet end of the static mixer tube.

Similar numbers refer to similar parts throughout the drawings.

DESCRIPTION OF THE PREFERRED EMBODIMENTS

Figure 1:
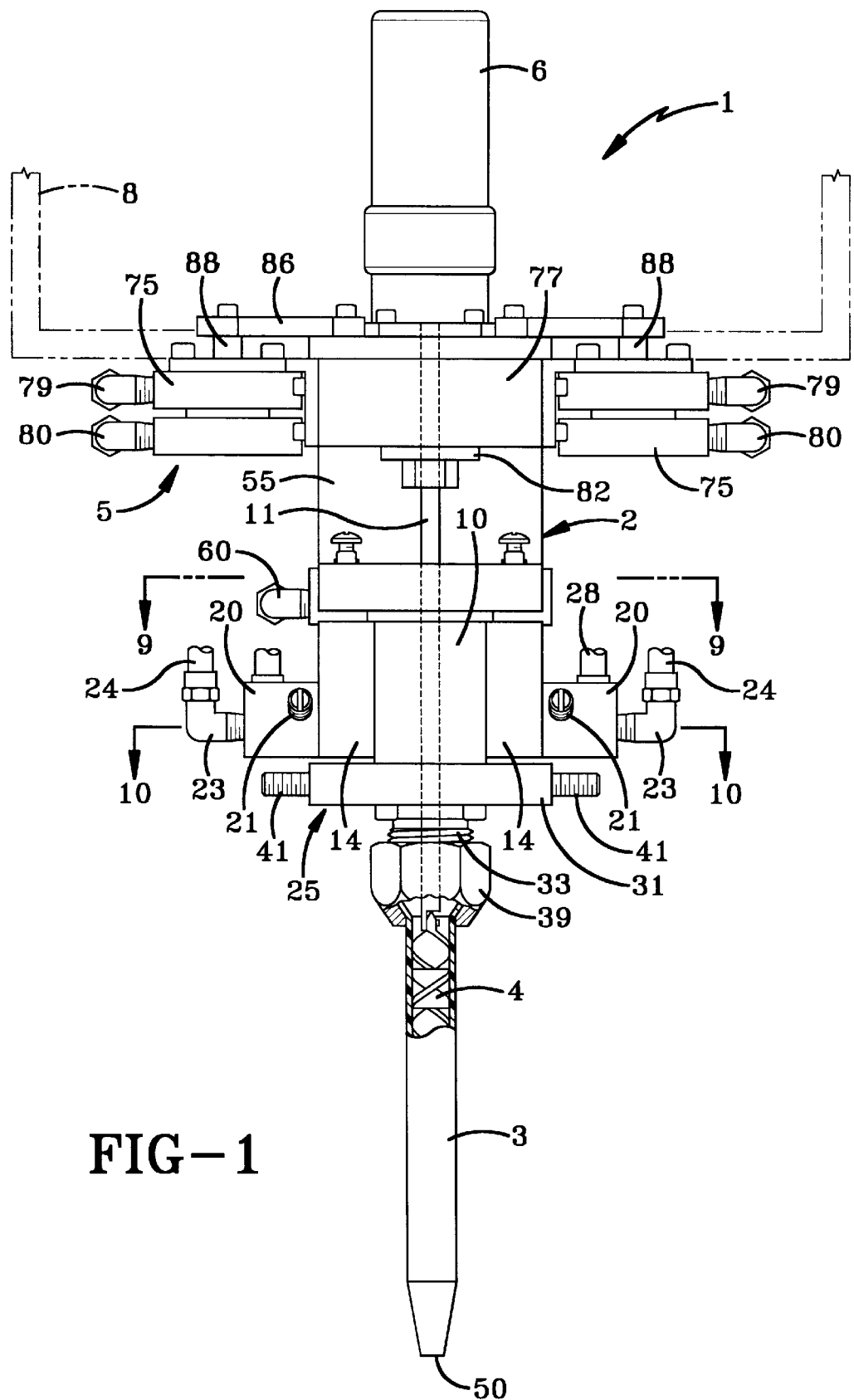
FIG. 1 is a front elevational view of the improved dispensing equipment.
Figure 2:
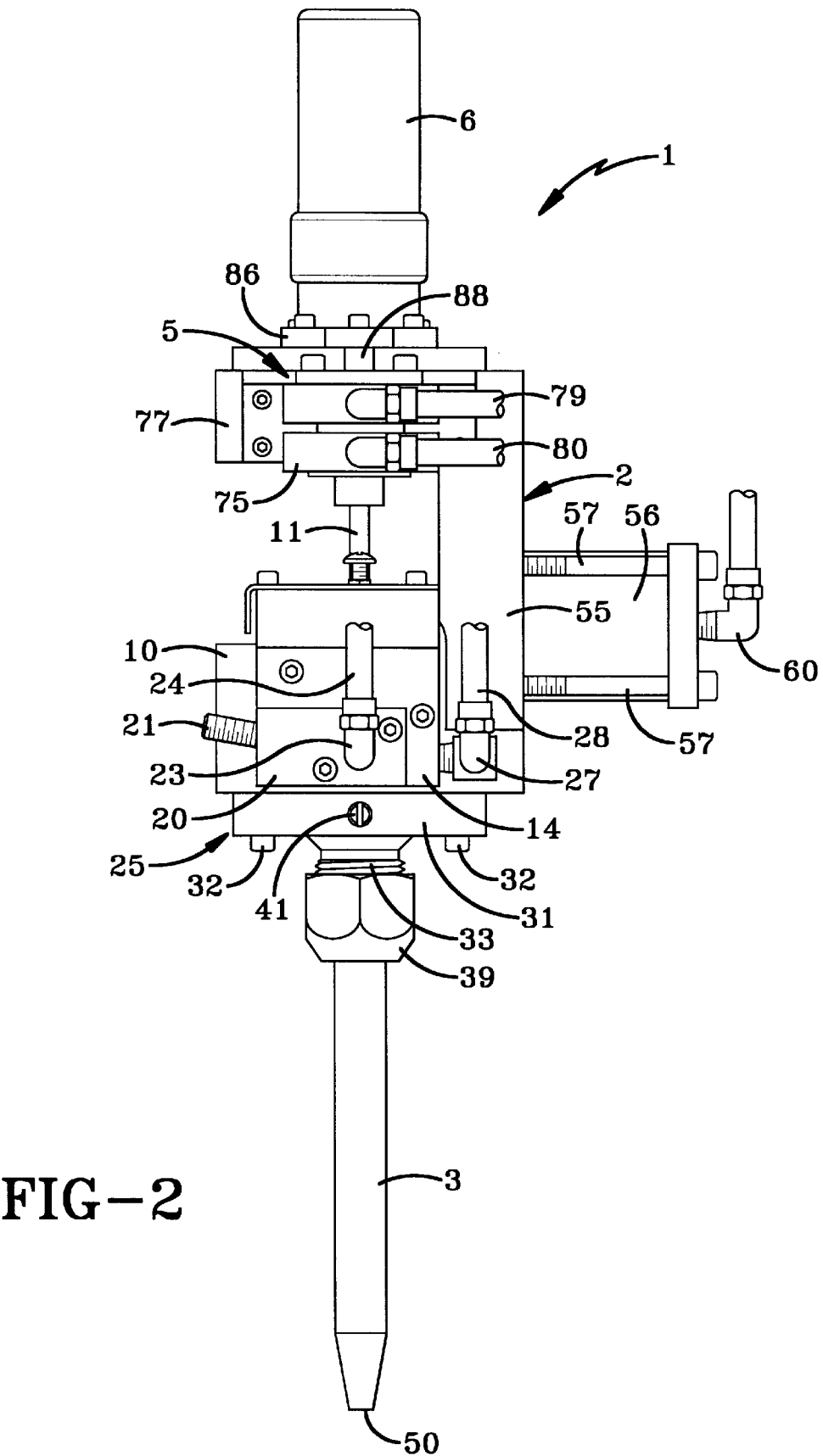
FIG. 2 is a right side elevational view of the dispensing equipment shown in FIG. 1.
Figure 3:
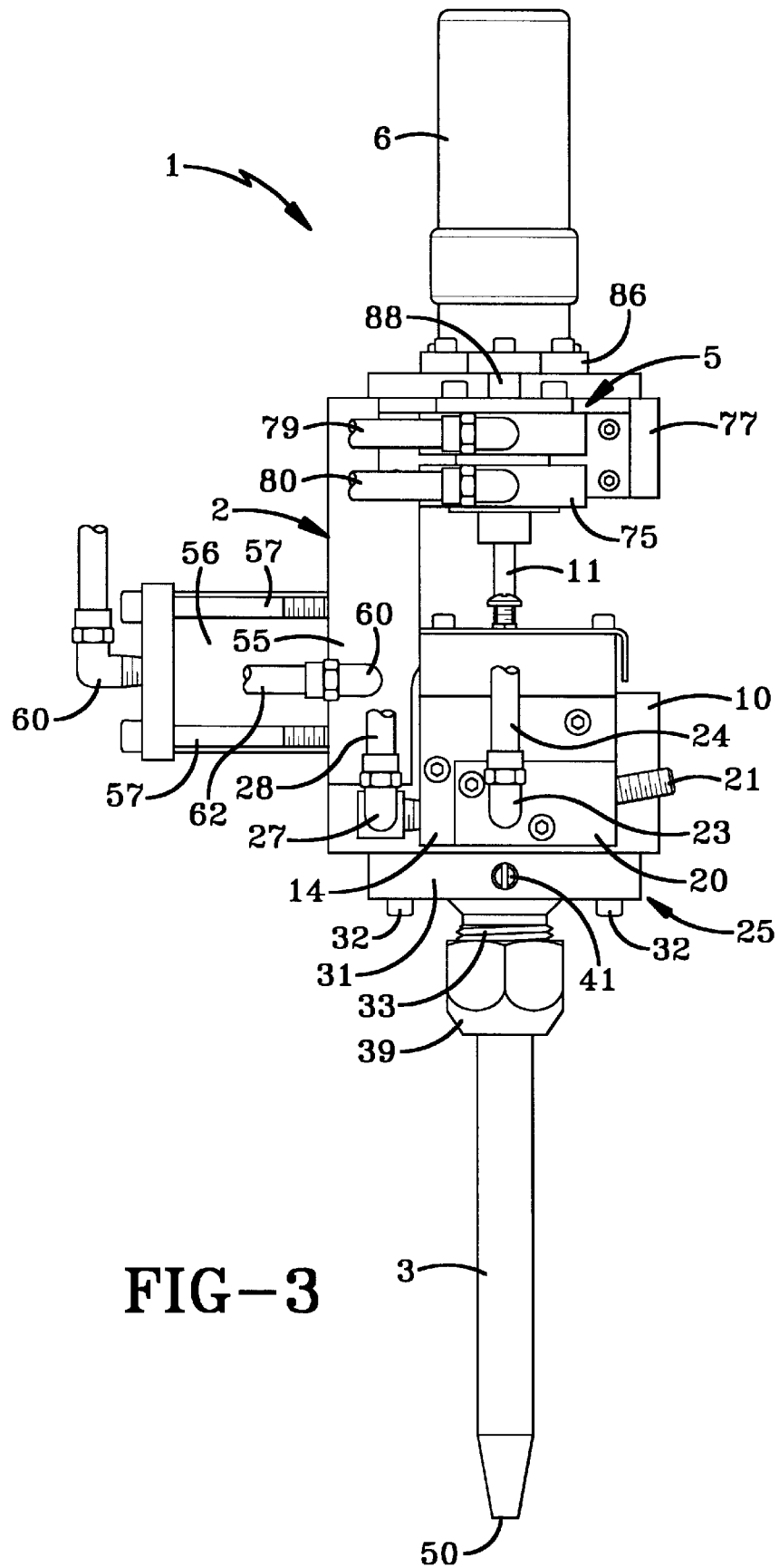
FIG. 3 is a left side elevational view of the dispensing equipment shown in FIG. 1.
Figure 4:
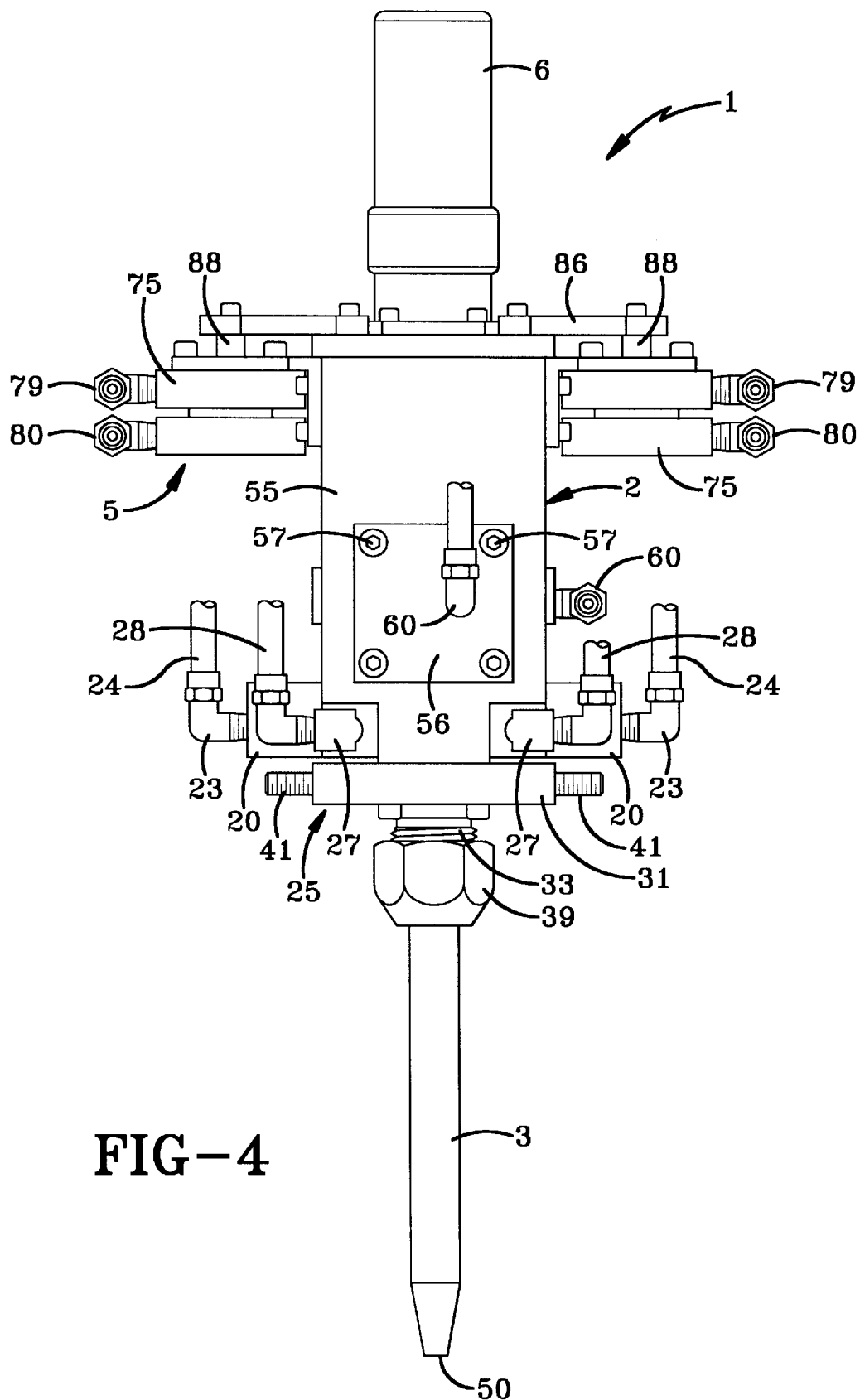
FIG. 4 is a rear elevational view of the dispensing equipment shown in FIG. 1.
Figure 5:
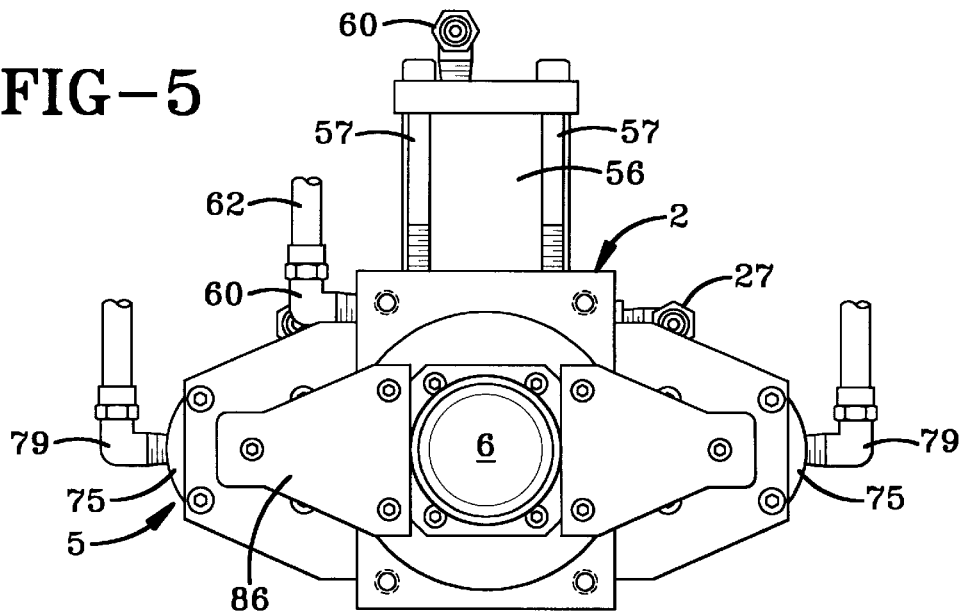
FIG. 5 is a top view of the dispensing equipment shown in FIG. 1.

The dispensing device of the present invention is indicated generally at 1, and is shown generally in FIGS. 1–5. Device 1 includes as its main components a housing 2 which contains a flow control mechanisms described further below, for controlling the flow of two liquid materials into a mixer tube 3. Tube 3 contains a mixing element 4. A piston control assembly indicated generally at 5, is mounted on housing 2 and provides the anti-drip or positive shut-off feature of the invention. A pneumatic motor 6 is mounted on piston assembly 5 and provides for the dynamic mixing of the two liquid materials by rotating mixing element 4 within tube 3. FIG. 1 shows one manner of mounting device 1 on a support bracket 8 shown in dot dash lines, wherein it can be incorporated with robotic equipment or the like, or mounted in a stationary position wherein the device extends in a vertical relationship. However, it is readily seen and understood that device 1 could be mounted in other orientations than that is shown in FIGS. 1–4, and if desired, it can be a portable hand held system.

Figure 10:
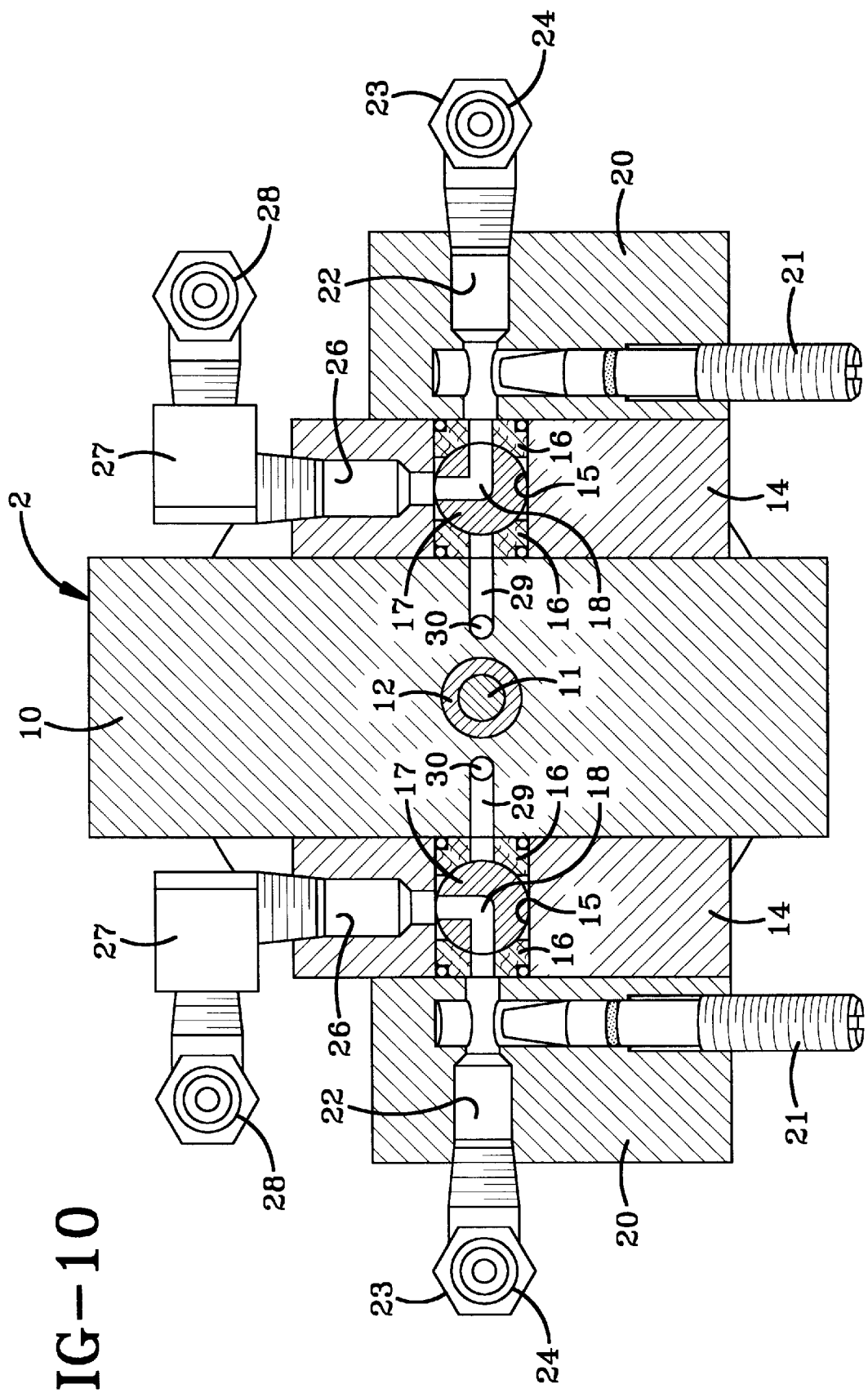
FIG. 10 is an enlarged fragmentary sectional view taken along line 10—10, FIG. 1, with the flow control valves shown in closed position.

Housing 2 includes a main support block 10 (FIGS. 10 and 11) through which a main control shaft 11 extends and which is slidably and rotatably surrounded by a bushing 12. A pair of valve blocks 14 are mounted on both sides of block 10 and include chambers 15. A pair of ball valve seats 16 are mounted within each chamber 15 for rotatably supporting a ball valve 17. Each ball valve 17 includes an L-shaped liquid passage 18 for stopping and starting the flow of the two liquid materials depending upon the rotational position of ball valve 17 within the ball seats. A recycle block 20 is mounted on the outer surface of each valve block 14 and contains a flow control screw 21 rotatably mounted therein for compensatory for back pressure created within the two liquid streams. A fluid inlet opening 22 is formed in each block 20 in which is secured a L-shaped coupling 23 to which is connected a fluid line 24 which connects to one of the two liquid supplies (not shown). A fluid material inlet passage 26 is formed in each valve block 14 and has another L-shaped coupling 27 secured therein to which is connected an incoming fluid line 28 which is connected to the same source of fluid as is line 24 to provide for the continuous circulation of the fluid even when the ball valves 17 are in the flow through or closed position of FIG. 10 to provide for the continuous circulation of the two liquids. The same arrangement of fluid passages, couples and fluid lines are contained in the other block 20 for the second of the two liquid materials.

Figure 11:
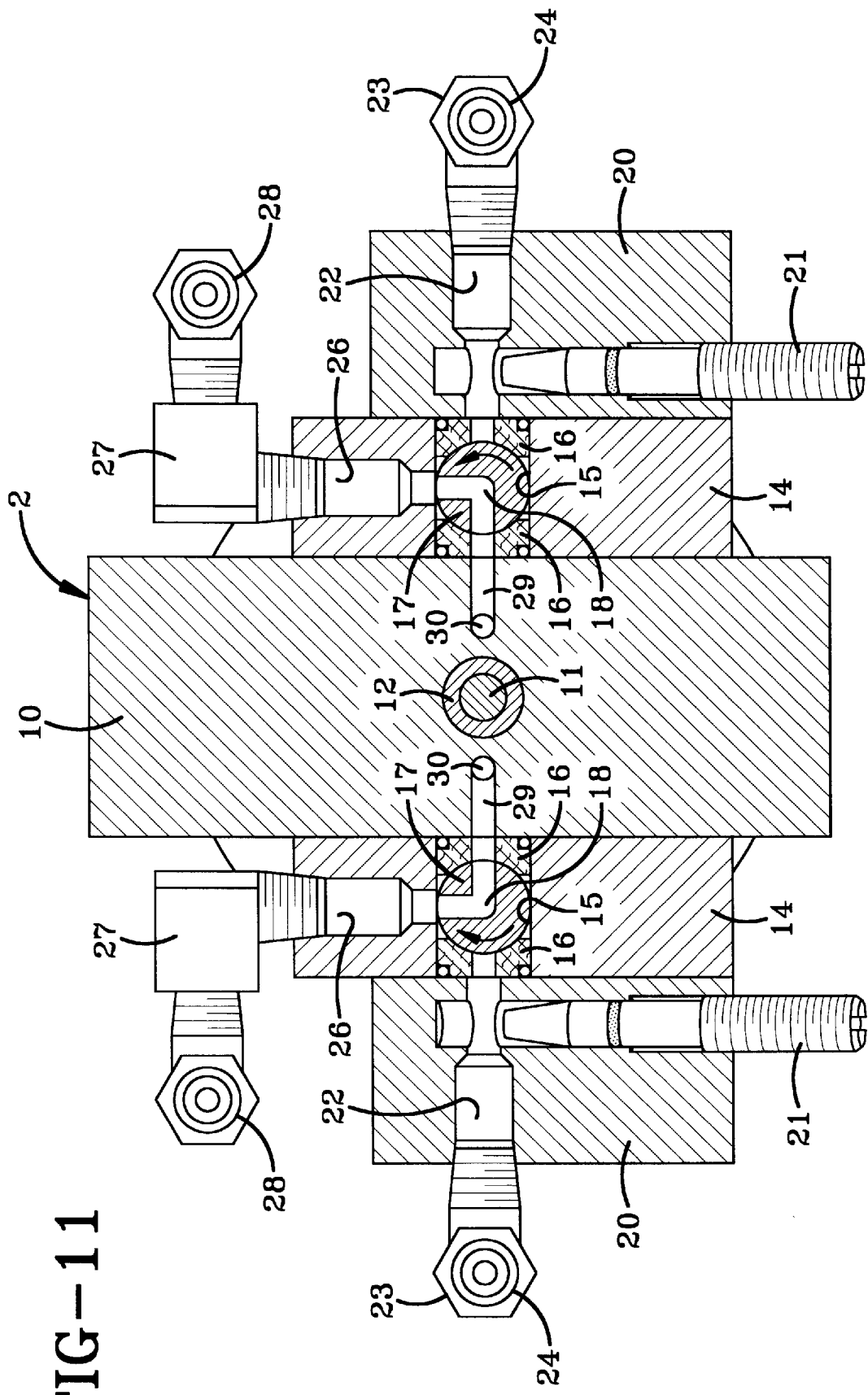
FIG. 11 is a view similar to FIG. 10 with the flow control valves shown in open position.

When ball valves 17 are in the open on position as shown in FIG. 11, one leg of each of the L-shaped passages 18 is in fluid communication with a passage 29 formed in block 10 which communicates with a fluid passage 30. Passages 30 extend through block 10 and through aligned passages 34 formed in an end boss indicated generally at 25. Boss 25 includes a disc-shaped position 31 which is mounted on the outer face block 10 by a plurality of bolts 32 and an externally threaded neck 33. Mixing tube 3 (FIG. 12) includes a bell-shaped end 36 which is seated on an annular collar 37 of neck 33 and secured thereon by an internally threaded lock ring 39. A pair of flow control screws 41 are mounted in a pair of openings 42 formed in boss position 31 with a conical-shaped nose 43 thereof extending into a respective fluid passages 34 for controlling the flow rate of the two streams of fluid materials therethrough. A bushing 45 is mounted within bore 47 of neck 33 to provide for the rotation and sliding movement of shaft 11. As is shown in FIG. 12, the two liquid materials indicated by arrows A and B, will flow through fluid passages 30 and 34 and into bore 49 of mixer tube 3 where it will flow around the individual flights of helical mixing element 4 to mix together before being discharged from an outlet end 50 of tube 3.

Figure 9:
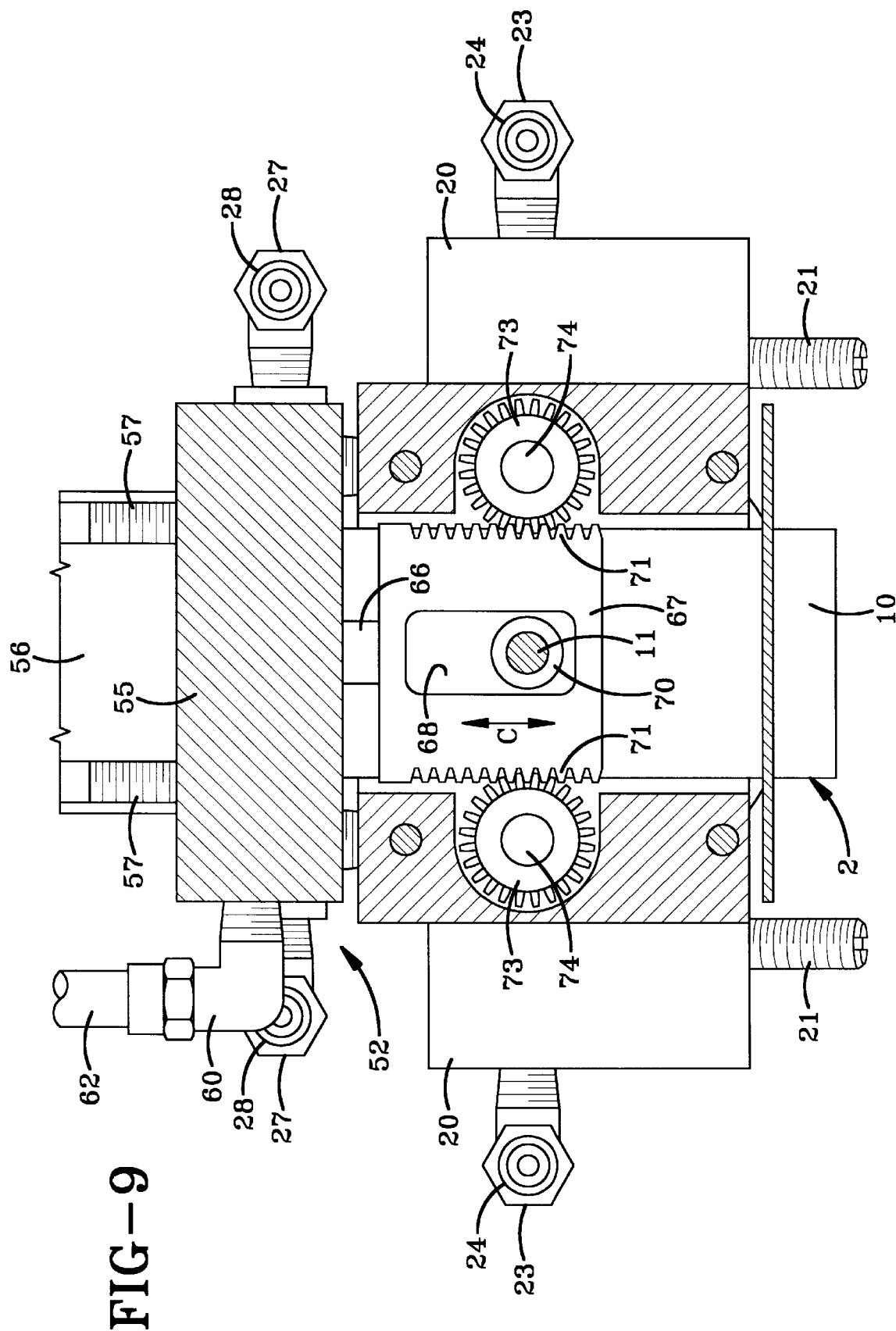
FIG. 9 is an enlarged fragmentary sectional view taken along line 9—9, FIG. 1.

One type of mechanism for controlling the movement of ball valves 17 is shown particularly in FIG. 9 and is indicated generally at 52. Ball valve control assembly 52 includes a main mounting block 55 which is connected to block 10 and extends outwardly therefrom for supporting at one end piston control assembly 5. An air cylinder 56 (FIGS. 3 and 9) is connected by four attachment bolts 57 to mounting block 55 and has a pair of air control lines 59 and 62 connected by L-shaped couplings 60 to air cylinder 56 for actuating an internal piston as described further below. Actuation of air cylinder 56 will move a control shaft 66 and a connected gear rack 67 as shown by arrow C. Gear rack 67 is formed with a rectangular-shaped central opening 68 through which main control shaft 11 extends and which is supported by a bushing 70. Gear rack 67 has a plurality of teeth 71 along opposed sides thereof which mesh with the teeth of gears 73. Gear mounting shafts 74 are connected with ball valves 17 for moving the ball valves between the closed position of FIG. 10 and the open position of FIG. 11 for stopping or starting the flow of the two fluid materials into mixer tube 3. Therefore, actuation of air cylinder 56 by the appropriate control logic will move gear rack 67 which in turn rotates gears 74 which are operatively connected to ball valves 17 for moving the valves between the open and closed positions. The operation of air cylinder 56 is controlled by compressed air selectively entering air line 59 or 62.

Other types of control mechanisms for stopping and starting the flow of the two liquid materials into mixer tube 3 can be used without effecting the present invention.

Figure 6:
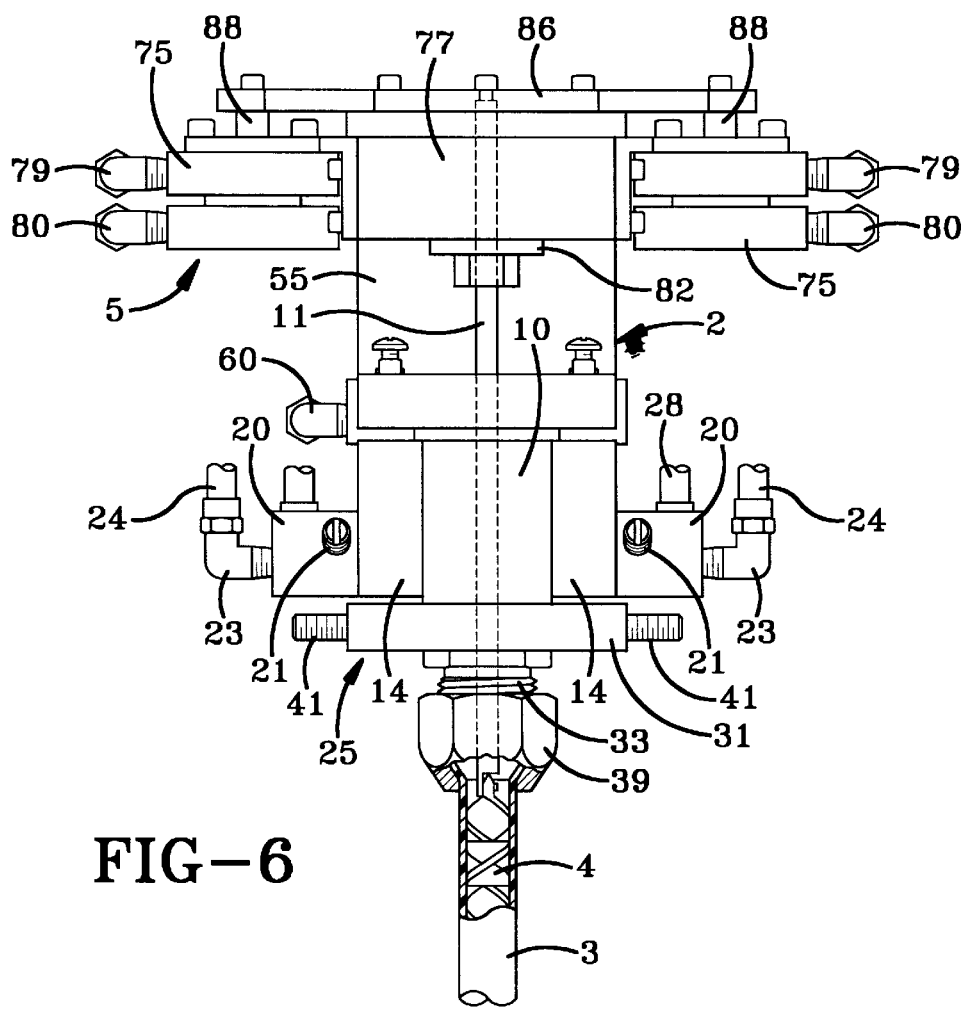
FIG. 6 is a front elevational view similar to FIG. 1 of a modified form of the dispensing equipment.
Figures 7, 8:
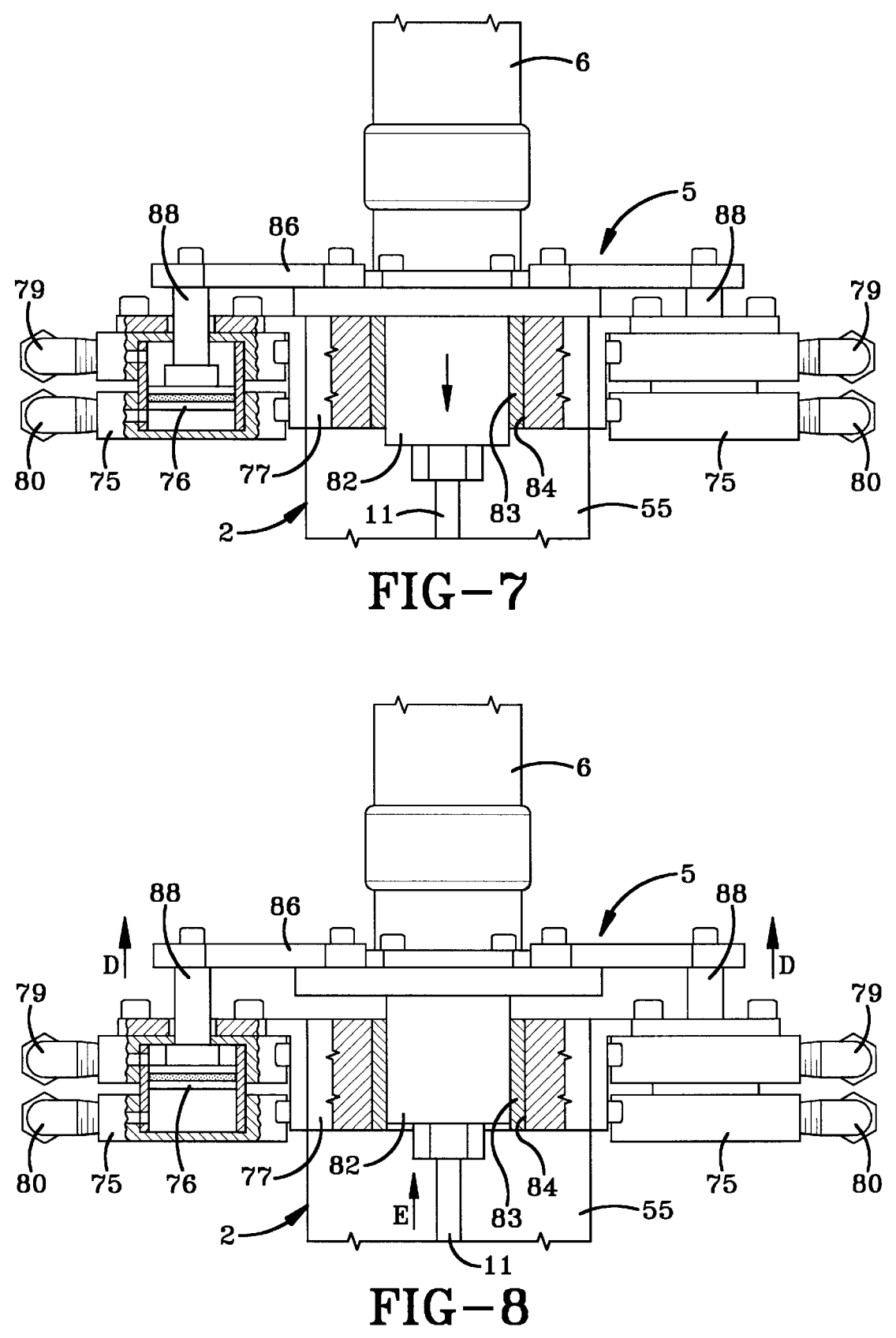

In accordance with one of the main features of the present invention, piston control assembly 5 is connected to control shaft 11 for moving the control shaft axially along the device and particularly axially linearly with respect to mixer tube 3 for controlling the motion of mixing element 4 as discussed below. Control assembly 5 (FIGS. 1–5 and 7–8) includes a pair of pneumatic cylinders 75 mounted opposite of each other on a support block 77 which extends outwardly from an upper end of mounting block 55. Each cylinder 75 contains a piston 76 (FIG. 7) which is reciprocated by compressed air entering and exiting cylinders 75 through pairs of air lines 79 and 80 which are connected to a source of compressed air (not shown). As shown in FIGS. 6 and 7, shaft 11 is connected to a slide block 82 which is slidably mounted within a bushing 83 mounted within an opening 84 formed in the center of support block 77.

In accordance with another feature of the invention, block 82 and shaft 11 are operatively connected to pneumatic motor 6 so as to be rotated by motor 6. Motor 6 is mounted on an end plate 86, the ends of which are connected to piston rods 88 which are connected to pistons 76 so that upon actuation of the pistons rods 88 will move end plate 86 and correspondingly pneumatic motor 6, outwardly in the direction of arrows D (FIG. 8) or in the opposite direction from that of FIG. 8 to the position of FIG. 7 which will correspondingly move shaft 11 as shown by arrow E in the corresponding direction.

The forward end 89 of shaft 11 (FIG. 12) is connected by a pin 90 or other type of fastener, to the inlet end of mixing element 4 so that shaft 11 will either rotate mixing element 4 upon its rotation by motor 6, or move mixing element 4 linearly axially within bore 49 of mixing tube 3 as shown by arrow F in FIGS. 12, 13, and 14.

The rotational movement of mixing element 4 by motor 6 will enhance the mixing effect of mixing element 4 as the two streams A and B of liquid materials move into bore 49 and through mixing tube 3 before being discharged from the outlet end 50 of tube 3 thereof. Likewise, the axial linear movement of shaft 11 and mixing element 4 which occurs upon the actuation of piston control assembly 5 by the introduction of pressurized air into cylinders 75, may be used either to provide a positive closure of outlet end 50 as shown in FIGS. 13 and 14 or in the alternative can operate by moving in the opposite direction that is axially linearly toward the inlet end of mixer tube 3 which will cause a back pressure or "snuff back" effect to prevent the dripping or leakage of the mixed material from outlet end 2. A positive seal is shown in FIGS. 13 and 14 whereas a cone-shaped nose 94, ball 95 or similar structure is mounted on the outlet end of mixing element 4 which when moved axially forward will seat against a matching surface at outlet end 50 of tube 3. Other types of positive sealing surfaces such as o-rings could be used at outlet end 50 to replace the conical-shaped nose 94 or ball 95 if desired without effecting the concept of the invention. Thus, depending upon the particular viscosity and characteristics of the liquid materials, device 1 can be programmed to either provide for the positive blockage at the open outlet end 50 of tube 3 to prevent drippage or can create the "snuff back" effect to prevent drippage. In either situation, it is the linear axial movement of shaft 11 with respect to tube 3 by piston control assembly 5 which enables this desired effect to be achieved.

A modified form of device 1 is shown in FIG. 6 and is similar to that described above with the exception that shaft 11 is connected directly to end plate 86 which does not have a pneumatic motor mounted thereon. Thus, upon actuation of pneumatic cylinders 75 end plate 86 will move shaft 11 and mixing element 4 axially linearly within mixer tube 3 to provide for the desired stoppage of the mixed liquid materials. However, no dynamic mixing is provided to mixing element 4 in the embodiment shown in FIG. 6 since for certain applications a satisfactory mix is achieved by the use of a motionless mixing element 4 without requiring any rotation thereof.

Figure 15:
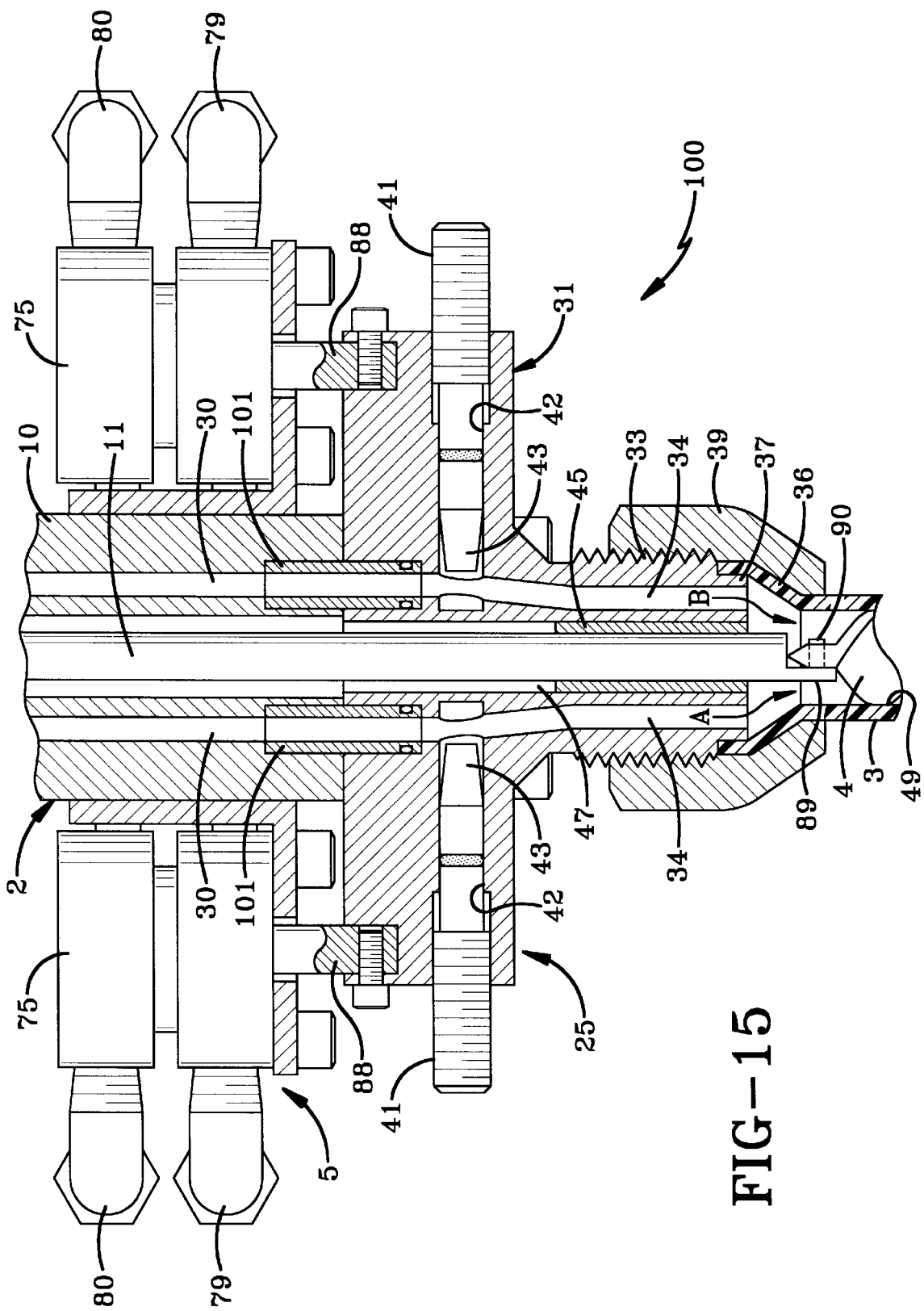
FIG. 15 is a view similar to FIG. 12 showing another embodiment of the improved dispensing equipment.

A still further modification of the improved dispensing device is indicated at 100 and is shown in FIG. 15. In this embodiment, piston rods 88 of piston assembly 5 are connected to boss 25 so that upon actuation of pneumatic cylinders 75 and pistons 76, rods 88 will move boss 25 and connect mixer tube 3 while retaining shaft 11 in a stationary position instead of moving shaft 11 with respect to stationary tube 3 as described above for the embodiments of FIGS. 1 and 6. In embodiment 100, several modifications will be made in the connection of the feed passages 30 to mixer tube 3 to maintain a fluid tight seal as boss 25 and piston assembly 5 move with respect to each other. One manner of accomplishing this is by securing a tube 101 is each passage 30 which are slidable within boss passages 34. In the embodiment of FIG. 15, shaft 11 and mixing element 4 will not move linearly within tube 3 but the reverse would occur, namely that tube 3 will move linear with respect to fixed mixing element 4. Also, if desired, mixing element 4 can be rotated by motor 6 to enhance the mixing of the two materials if desired.

Thus device 1 including its embodiments shown in FIGS. 6 and 15 provide for the enhanced mixing of two liquid materials by rotating the mixing element 4 within mixing tube 3 and most importantly provides for an extremely simple and efficient mechanism for moving mixing element 4 and mixing tube 3 linearly axially with respect to each of the to provide for a positive shut-off by closing the outlet end 50 of tube 3 or by creating a "snuff back" effect within the mixer tube to prevent the leakage of the mixed materials therefrom. Even though the various devices such as motor 6, piston control assembly 5 and ball valve control air cylinder 56 are described as being pneumatic, other types of actuating mechanisms such as hydraulic or even mechanical devices could be used to achieve the same motion as those achieved by these components. However, the use of air has been found to be the most efficient and economical since most facilities will have compressed air at the location where the liquid application is being carried out.

Likewise, although mixing element 4 is shown and described as being a helical type of mixer such as shown in U.S. Pat. No. 4,014,463, heretofore referred to as a motionless mixer, other types of mixing elements could be utilized within mixer tube 3 for rotation by shaft 11 without effecting the concept of the invention.

Accordingly, the improved device for mixing and dispensing two flowable or liquid materials is simplified, provides an effective, safe, inexpensive, and efficient device and method which achieves all the enumerated objectives, provides for eliminating difficulties encountered with prior devices and methods, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the device for mixing and dispensing two flowable materials is constructed and used, the characteristics of the construction, and the advantageous new and useful results obtained; the new and useful structures, devices, elements, arrangements, parts, method steps and combinations thereof are set forth in the appended claims.

What is claimed is:

1. A device for mixing and dispensing at least two flowable materials including:
   a housing having a pair of chambers, each having an inlet and an outlet for admitting and discharging a respective one of the flowable materials into and out of a respective one of said chambers;
   a mixer tube formed with a hollow internal bore extending therethrough having inlet and outlet ends; said inlet end communicating with the outlets of the housing chambers for admitting the flowable materials into said tube;
   a mixing element mounted within the bore of the mixer tube to mix said flowable materials as they move through said bore; and
   control means for moving said mixing element and mixer tube axially with respect to each other to stop the flow of materials from the outlet end of said tube.

2. The device defined in claim 1 wherein the control means includes a shaft connected to the mixing element, and actuation means connected to the shaft for moving said shaft and connected mixing element axially within the mixer tube to stop the flow of materials from said mixer tube.

3. The device defined in claim 2 wherein the actuation means is a pneumatic actuated piston.

4. The device defined in claim 2 including a motor operatively connected to the shaft for rotating said shaft and connected mixing element to rotate said mixing element within the mixer tube.

5. The device defined in claim 4 wherein the motor is a pneumatic motor.

6. The device defined in claim 4 wherein the actuation means is a pneumatic actuated piston; and in which the motor is operatively connected to said pneumatic piston and movable therewith.

7. The device defined in claim 3 wherein the shaft and piston are operatively connected to an end plate; and in which said end plate is movable with respect to the housing upon actuation of the piston to axially move said shaft.

8. The device defined in claim 7 wherein a motor is mounted on the end plate and movable therewith; and in which said motor is operatively connected to the shaft for rotating said shift and connected mixing element.

9. The device defined in claim 7 wherein two of the pneumatic actuated pistons are operational, connected, each to a respective end of the end plate for moving said end plate; in which the two pistons are mounted on a mounting block; and in which the shaft extends through a bushing mounted in said mounting block.

10. The device defined in claim 1 including sealing means mounted on an outlet end of the mixing element for sealing engagement with a matching surface on the outlet end of the mixer tube to stop the flow of materials from the tube upon axial movement of the mixing element toward said outlet end of said mixer tube.

11. The device defined in claim 1 wherein the mixing element is a motionless helical mixer.

12. The device defined in claim 1 when the control means includes actuation means operatively connected to the mixer tube to move said tube linearly with respect to the mixing element.

13. The device defined in claim 12 wherein the actuation means is a pneumatic actuated piston.

14. A method of mixing and dispensing a pair of flowable materials from a device having a pair of material inlets and a pair of material outlets communicating with a mixer tube having an inlet end and an outlet end and containing a mixing element, said method includes the steps of:
   A) moving a pair of valves to an open position to permit the flow of materials into the mixer tube and through the mixing element for discharge through the outlet end of said tube;
   B) moving the pair of valves to a closed position to block the flow of material into the mixer tube; and
   C) moving the mixing element and mixer tube axially with respect to each other to prevent the leakage of materials from the outlet end of the mixer tube.

15. The method defined in claim 14 including the step of:
   (D) rotating the mixing element within the mixer tube to enhance the mixing of the two materials therein.

16. The method defined in claim 14 wherein step (C) includes the step of:
   E) moving an outlet end of the mixing element axially towards and into engagement with the outlet end of the mixer tube to block said outlet end of said mixer tube.

17. The method defined in claim 16 including the step of:
   (F) providing the outlet end of the mixing element with a contour matching the contour of the outlet end of said mixer tube to provide a sealing fit therebetween upon completion of step (E).

18. The method defined in claim 14 wherein step (C) includes moving the mixing element axially toward the inlet of the mixer tube creating a back pressure within said tube to prevent the leakage of materials therefrom.

19. The method defined in claim 15 wherein step (C) includes the step of: (G) providing a pneumatic piston operatively connected to a shaft which is connected to the mixing element for axially moving said mixing element within the mixer tube upon actuation of said piston.

20. The method defined in claim 19 wherein step (D) includes operatively connecting a motor to the shaft for rotating said shaft and connected mixing element.

21. The method defined in claim 15 wherein step (D) includes providing a pneumatic motor for rotating the mixing element.

22. A combination mixer tube and mixing element to be mounted on a discharge nozzle of a dispensing device for mixing and dispensing a pair of liquid materials, said combination including:

the mixer tube being formed with a hollow interior bore extending therethrough having inlet and outlet ends;

the mixing element being axially slidably mounted within the bore of the mixer tube and having a sealing member formed on an outlet end of said mixing element matching a surface on the outlet end of said mixer tube to provide a liquid sealing engagement therewith when axially moved into engagement therewith.

23. The combination defined in claim 22 whenever the mixing element is a helical mixer.

24. The combination defined in claim 22 whenever the sealing member is a cone-shaped.

25. The combination defined in claim 22 when the sealing member is spherical-shaped.

26. The combination defined in claim 22 when the matching surface at the outlet end of the mixer tube is cone-shaped.

27. The combination defined in claim 22 including connection means at an inlet end of the mixing element for connecting said mixing element to a control shaft for axially and rotationally moving said mixing element within the bore of the mixer tube.

* * * * *